Nov. 12, 1935.  R. E. MANLEY ET AL  2,020,693
METHOD OF FILTER AID DEWAXING HYDROCARBON OILS
Filed April 3, 1931
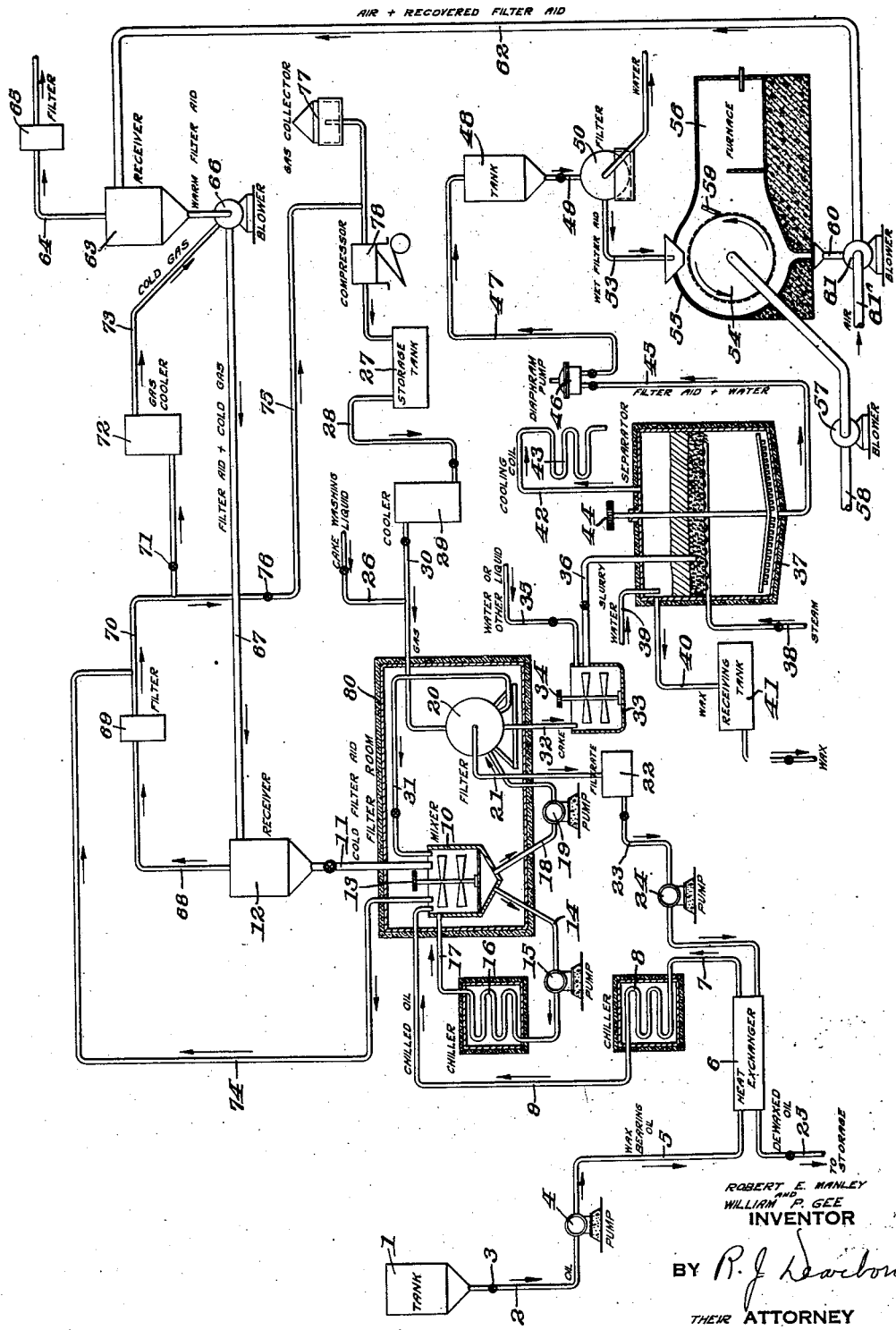
ROBERT E. MANLEY
AND
WILLIAM P. GEE
INVENTOR
BY
THEIR ATTORNEY Patented Nov. 12, 1935

2,020,693

UNITED STATES PATENT OFFICE 2,020,693

METHOD OF FILTER-AID DEWAXING HYDROCARBON OILS

Robert E. Manley, Port Arthur, Tex., and William P. Gee, Plainfield, N. J., assignors to The Texas Company, New York, N. Y., a corporation of Delaware Application April 3, 1931, Serial No. 527,470

8 Claims. (Cl. 196—19)

This invention relates to an improved process of and apparatus for dewaxing wax-bearing hydrocarbon oils and more particularly to a process in which wax is removed from the oil by filtration in the presence of filter aid material and the filter aid material is recovered for use in dewaxing further oil.

Broadly the invention contemplates a process of dewaxing hydrocarbon oil wherein the wax-bearing oil after chilling to a temperature which will effect precipitation of the solid and semi-solid waxy constituents of the oil is mixed with comminuted solid material or filter aid which has been separately chilled in a dry state to a less than normal atmospheric temperature and the admixture is subjected to filtration to separate the precipitated waxy constituents and filter aid material from the oil. The resulting filter cake of precipitated wax and filter aid material is treated to separate the wax therefrom and the substantially wax free filter aid material is exposed to high temperatures to remove absorbed matter and to restore its filter aid qualities for use in dewaxing more hydrocarbon oil.

The invention also contemplates an improved combination of apparatus which is particularly well adapted to carrying out the process of the invention.

More specifically the process of the invention contemplates chilling the wax-bearing hydrocarbon oil to a temperature which will effect precipitation of the waxy constituents of the oil and admixing with the chilled oil a filter aid material which has been previously cooled in a dry comminuted form to a temperature approaching that of the chilled oil. The chilled mixture is filtered to separate the precipitated wax and filter aid material from the oil and the wax free oil withdrawn to storage or for further treatment. The resulting filter cake of wax and filter aid material is commingled with a liquid such as water or a petroleum fraction preferably less volatile than gasoline such as kerosene or gas oil, or a combination of such liquid media adapted to displace wax from the filter aid material, and the resulting fluid suspension subjected to settling and heating in the presence of steam to separate the wax therefrom. The substantially wax-free filter aid material which has settled out in the form of a thick slurry is filtered to remove the bulk of the water associated therewith and the resulting filtered material exposed, while in the form of a relatively thin cake, to high temperatures and during which heating, hot gas may be drawn through the cake to drive off absorbed water and restore its filter aid qualities. The hot material is then cooled and chilled to temperatures approaching those to which the wax-bearing oil is chilled prior to filtration by blowing with cooled gases after which it may be admixed with fresh wax-bearing oil to be dewaxed.

In the prior art methods of removing wax from wax-bearing hydrocarbon oil by filtration in the presence of filter aid material the resulting filter cake of precipitated waxy constituents and filter aid material is usually treated with a volatile solvent liquid such as petroleum naphtha or benzol and the like to dissolve the waxy constituents and effect their separation from the filter aid material, and the resulting substantially wax-free filter aid material is then returned to the system for further use in a warm condition usually retaining large quantities of absorbed solvent liquid.

An objectionable feature in connection with the use of solvents for removing wax from filter aid material by the methods of the prior art is that relatively large quantities of solvent liquid must be employed due to the fact that a slurry of the liquid and filter aid material, in order to be pumpable, must not comprise more than approximately 25 per cent solids. The handling of large quantities of a volatile solvent is attended with appreciable losses of valuable liquid, particularly where, as is usually the case, the suspension of filter cake in the solvent liquid must be subjected to heating in order to effectively dissolve out the precipitated waxy constituents. Complicated recovery systems must therefore be provided in order to minimize as much as possible the loss of solvent material by vaporization.

Furthermore, the filter aid material absorbs 40 per cent or more by weight of solvent liquid which can be removed from the filter aid by drying or burning, although drying or burning as usually carried out is undesirable since the absorbed solvent is entirely lost, and furthermore, there is usually a large loss of the filter aid material itself in the form of dust evolved during such drying operations.

It is common practice therefore to add to the chilled suspension of separated wax or waxy constituents in oil, filter aid material containing approximately one-third to one-half of its own dry weight of solvent and at approximately normal atmospheric temperature. This addition of relatively warm solid and absorbed liquid to the cold oil causes an objectionable temperature rise in mixing and a resultant re-solution of the more soluble waxes which have already been precipitated from solution. This addition of relatively warm filter aid and absorbed solvent may effect a rise of 15° F. to 25° F. in the temperature of the mixture with a consequent increase in cold test of 10° to 15° F. on the dewaxed product. Consequently, it is desirable that the filter aid material be precooled in a dry state and added to the cold undewaxed oil solution in order to prevent this reheating and re-solution effect.

The process of the present invention provides improved means for the treatment of the filter cake of wax and filter aid material with oil or water, or both, and steam to displace the wax from the filter aid material without the necessity of employing volatile solvent liquids. The invention also provides for dehydrating and restoring the filter aid qualities of the filter aid material from which the wax has been displaced by exposing the resulting wax-free material to contact with hot flue gases to remove absorbed water and other material, without experiencing any substantial loss of the valuable filter aid material, following which the dehydrated and recovered material is subjected to blowing, preferably first with air to cool it to approximately atmospheric temperature and then with a chilled gas in order to cool it to a temperature approaching that of the chilled wax-bearing oil with which it is to be admixed prior to the filtering step.

The invention may be readily understood when considered in connection with the accompanying drawing which is a flow diagram illustrating, diagrammatically, interconnected units of apparatus for carrying on the various steps of the invention.

Referring to the drawing, a tank 1 is provided from which a wax-bearing lubricating oil, which may be diluted with a suitable amount of naphtha or other solvent, is drawn through a pipe 2, having a valve 3, by a pump 4 which delivers the oil through a pipe 5 to a heat exchanger 6 wherein the oil is passed in indirect heat exchange relationship with a cool stream of filtered wax-free oil leaving the system to thereby precool the charge. The partially cooled oil is conducted through a pipe 7 to a suitable chiller 8 wherein it undergoes further cooling and chilling and following which it is introduced through a pipe 9 to a mixer 10.

Filter aid material which has been previously chilled or cooled in a dry comminuted state, as will shortly be described in more detail, may be introduced through the chute 11 from the hopper 12 to the mixer 10 wherein it may be completely admixed with the chilled oil and precipitated waxy constituents by means of a stirring mechanism 13.

In order to maintain the contents of the mixer at a suitable temperature a portion thereof may be withdrawn through a pipe 14, by a pump 15, and passed through an auxiliary chilling coil 16 from which it is returned through a pipe 17 to the mixer 10.

The chilled mixture of oil, precipitated wax and filter aid material is withdrawn through a pipe 18, by a pump 19, and delivered to the shell of a filter 20, preferably of the rotating leaf type adapted to operate under superatmospheric pressure, although it is contemplated that other types of filters operating under pressures either above or below atmospheric pressure may also be employed. The wax free oil leaving the filter 20 is withdrawn through a pipe 21 to an insulated receiving tank 22 from which it is drawn through a pipe 23, by a pump 24, and delivered to the heat exchanger 6, already mentioned, and from which it may be drawn off through a pipe 25 to storage or for further treatment as may be desired.

At the completion of a filtering cycle the resulting filter cake may be washed with fresh chilled naphtha which may be introduced to the filter through a pipe 26 from a source not shown. Following this the cake is dried by passing gas therethrough. An inert gas, preferably flue gas, is drawn from a suitable pressure storage tank 27 through a pipe 28, and conducted through a cooler 29 wherein the gas may be cooled either by direct or by indirect contact with a cooling medium. From the cooler 29 the cold gas may be introduced through a pipe 30 to the shell of the filter 20 under sufficient pressure to displace the liquid contents of the filter through a pipe 31 back into the mixer 10. When the liquid has been completely displaced from the filter shell, the gas may be momentarily introduced to the interior of the filter leaves so as to facilitate breaking the cake away from the exterior of the leaves. The cake upon falling to the bottom of the filter shell is transferred by an internal screw conveyor (not shown) to a conduit 32 through which it is introduced to a vessel 33 provided with a suitable paddle or stirring mechanism 34 and which may also be provided with suitable heating means, not shown in the drawing.

Water or oil such as light gas oil, kerosene or heavy naphtha, or both, may be introduced through a pipe 35, from sources not shown, to the vessel 33 wherein by means of the paddle 34 the filter cake is pulped up to form a pulp or slurry which is discharged from the vessel 35 through a pipe 36 extending to about the inner center of a settling or separating vessel 37.

When the filter cake discharged from the press 20 contains substantial amounts of oil, it may be introduced to the settling vessel 37 in the form of a slurry or suspension in water and wherein the wax or petrolatum is effectively displaced from the filter aid material while maintaining the admixture in a hot condition by steaming or by other suitable heating means. If, on the other hand, the filter cake is substantially dry and free from oil, the waxy material may be more difficultly separable in which case we find it advantageous to introduce a quantity of light gas oil instead of water to the vessel 33 to form therein a pulp of filter cake and oil, since we have found that the wax may be more effectively displaced from such a mixture during subsequent steaming in the presence of water in the settling vessel 37.

The contents of the settling vessel 37 may be regulated so as to maintain a layer or stratum of petrolatum, or wax diluted with oil, in the upper portion of the vessel and which has been displaced and separated from the filter aid material. Immediately below this stratum of separated petrolatum, and occupying the mid portion of the vessel, there is frequently a substantial stratum largely in emulsified form and composed of fresh filter cake, pulp or slurry, petrolatum, oil, filter aid material and water. The filter aid material from which the wax has been displaced settles out of this middle stratum into the bottom of the vessel to form therein a lower or bottom stratum of filter aid material suspended in water.

Steam is introduced to the vessel 37 through a horizontal steam spray 38, preferably located within the interior of the vessel 37 at about its mid point and approximately adjacent to the discharge opening of the pipe 36, while an inlet 39 is provided near the top of the vessel through which water, preferably after heating, may be introduced from a suitable source, not shown in the drawing. The introduction of steam through the spray 38 provides heat, serving to break down the emulsion while the water acts as a medium to displace the petrolatum or wax from the filter aid material and the displaced wax rises through the water and other liquid to accumulate in the upper portion of the tank while the filter aid material settles out in the bottom of the vessel. Although not shown, the vessel 37 may be provided with indirect heating means.

The surplus petrolatum or wax liquid collecting in the upper portion of the vessel 37 overflows through a pipe 40 into a receiving tank 41 from which it is withdrawn to storage or for filtering or straining to remove traces of filter aid material remaining therein.

A vapor outlet pipe 42 is provided at the top of the vessel 37 leading to a cooling and condensing coil 43 through which steam or other vaporized material, such as naphtha solvent adhering to the filter cake when it is removed from the filter press, is drawn off from the vessel 37 and collected in condensed form.

The wax-free filter aid material settling out in the bottom of the vessel 37 is drawn by means of a rake or drag 44 to a discharge outlet at the bottom thereof from which it is drawn through a pipe 45 in the form of a thick slurry by a diaphragm pump 46 and delivered through a pipe 47 leading to a tank 48.

From the tank 48 the slurry or filter aid material is discharged through a pipe 49 onto a filter 50, advantageously of the rotating drum type, adapted to remove the greater portion of the water and form a damp cake of filter aid material which may retain a substantial amount of absorbed water. The filter cake being discharged from the filter 50 is conducted by means of a chute 53 onto a rotating drum 54 operatively supported within a furnace 55. The drum 54 is somewhat similar in construction to a vacuum drum filter having its cylindrical exterior and porous surface covered with a metal filtering cloth capable of withstanding temperatures of several hundred degrees Fahrenheit.

The damp filter aid material is disposed over the surface of the drum 54 to form a relatively thin cake of material, and hot gases from the combustion space 56 of the furnace are directed over the surface of the cake and drawn through it into the interior of the drum 54 due to the vacuum exerted therein by means of a suction blower 57 which withdraws the flue gas together with moisture removed from the filter aid material from the interior of the drum and discharges it to the atmosphere through a pipe 58. As the drying cake of material advances towards the combustion space of the furnace, it is exposed to progressively higher temperatures and is finally exposed to direct heating by radiation to remove the final traces of moisture and absorbed or adsorbed oil or waxy material otherwise tending to remain in the filter aid material.

In this type of drier where vacuum is exerted on the drying material causing it to adhere to the filtering surface, finely divided filter aid material which would otherwise be evolved and lost as dust in the ordinary types of roasting furnaces, remains comparatively undisturbed in the main body of material, the filter cloth and adhering cake preventing such fine material from passing into the interior of the drum along with the gas being drawn through the filtering surface.

The finally dehydrated material is removed from the surface of the drum by a blade 59 and falls to the bottom of the furnace or drier from which it is discharged into a chute 60 leading to a blower 61. The blower 61 picks up the filter aid material and forces it along with a current of air through a pipe or passageway 62 leading to a receiver or hopper 63 provided with internal baffling means (not shown) and which may be similar to those employed in the cyclone type of dust separator. During passage through the pipe 62 the filter aid material is brought into intimate contact with the cool air being forced therethrough by the blower 61 from the line 61a, thereby cooling the filter aid material to about atmospheric temperature.

The partially cooled filter aid material collects in the bottom of the receiver 63 while the air escapes from the top of the receiver through a pipe 64 leading to a bag filter 65 or other suitable means adapted to remove dust or any fine particles of filter aid material remaining suspended in the air leaving the receiver 63 after which it may be discharged to the atmosphere and the fine material recovered therefrom subsequently returned to the main body of filter aid material circulating through the dewaxing system.

The cooled filter aid material collecting in the receiver 63 is picked up by a blower 66, employing chilled flue gas from the line 73 as an impelling medium, and is conducted through an insulated pipe 67 to the receiving means 12, already mentioned, and which is similar to the receiver 63. The flue gas is separated from the filter aid material in the receiver 12 and is discharged therefrom through a pipe 68 leading to a bag filter 69 adapted to remove the entrained dust or fine particles of filter aid material, following which the gas flows through a pipe 70, having a valve 71, leading to a cooler 72 in which the flue gas is chilled to any suitable temperature by passing it in either direct or in indirect heat exchange relationship with cold brine or other suitable refrigerating media. The chilled flue gas then flows through a pipe 73 to the suction side of the blower 66 to entrain and carry the filter aid material along the passage 67 wherein the filter aid material, as a result of being intimately contacted with the chilled flue gas, is cooled to a desired temperature which may be approximately the same as the temperature of the wax-bearing oil leaving the chiller 8.

The flue gas which is used in displacing the contents of the filter shell 20 preparatory to discharging the filter cake therefrom flows through the pipe 31 along with the displaced oil into the mixer 10 from which the flue gas escapes through a pipe 74 connecting with the pipe 70 where it joins with the main body of circulating cooling gas and provides the necessary make-up gas to compensate for loss of circulating gas due to leakage from the system. Flue gas accumulating in the circulating system in excess of that required therefor may be removed from the system through the pipe 75, having a valve 76, and be discharged into a gas collector 77 which provides storage from which additional flue gas may be subsequently supplied by means of a compressor 78 which compresses the gas and delivers it to the pressure storage tank 27 and to which reference has already been made.

In the operation of the process the oil to be dewaxed, for example, an acid treated lubricating oil having an A. S. T. M. pour test of about 90° F. and which has previously been diluted with from 40% to 70% by volume of a suitable solvent, such as petroleum naphtha, is drawn from the tank 1 at a temperature of about 100° F. and passed through the heat exchanger 6 wherein it is cooled to around 60° F. The partially cooled oil is then passed through the chiller 8 wherein the temperature is reduced to the degree desired to effect precipitation of the waxy constituents, as for example around −35° F. at which temperature it is introduced into the mixer 10. A suitable proportion of filter aid material which has been chilled in a dry comminuted form to a temperature of around 40° F. or lower is introduced to the mixer 10 from the hopper 12 and admixed with the oil and precipitated waxy constituents. The chilled admixture is conducted through the pipe 18 by the pump 19 to the filter 20 by which means the precipitated waxy constituents and filter aid material are separated from the oil while maintaining the admixture at substantially the same temperature prevailing within the mixer 10.

When a filter cake of desired thickness has been formed upon the leaves of the filter 20 the charge is cut off and cold flue gas introduced to the shell of the filter through the pipe 30 to displace the liquid contents of the filter shell through the pipe 31 back to the mixer 10. The flow of cold flue gas may be continued a sufficient length of time to remove as much as possible of filtering oil from the cake so as to produce a substantially dry cake. The cake may advantageously be washed with cold naphtha or other suitable fresh solvents prior to drying it by blowing with cold gas.

The dry cake upon being discharged from the filtering surfaces is removed from the filter and delivered into the tank 33. Either water or wax solvent liquid, depending on the nature of the cake, is introduced to the tank 33 to form a filter cake pulp which is conducted to the settling tank 37 wherein separation between the wax and filter aid material is effected in the presence of steam and hot water as previously described.

The substantially wax-free filter aid material now in the form of a suspension in water is removed from the bottom of the vessel 37 by the pump 46 and discharged into the tank 48 from which it is delivered to the drum filter 50 to separate the water from the filter aid material. The filtered material containing around 40% by weight of absorbed water is then delivered to the drying drum 54 within the furnace 55 where it is exposed to hot flue gases drawn through it by the suction fan 57 and in which case the drying cake of material may be exposed to temperatures of around 600° F. although higher temperatures may be employed if desirable in order to drive off the final traces of absorbed moisture as well as to remove small amounts of retained oil or waxy matter.

The dehydrated filter aid material heated to a temperature of upward of 600° F. is removed from the furnace and blown with air through the pipe 62 leading to the receiver 63. During passage through the pipe 62 the hot filter aid material may be cooled due to contact with the air to a temperature of around 150° F. or lower. From the receiver 63 the partially cooled material is blown by the fan 66 through the pipe 67 using as an impelling and chilling medium cold flue gas which is being continually recycled through the cooler 72 in which the gas may be cooled to a temperature, for example, of around −150° F. During passage of the filter aid material through the pipe 67 in the presence of the cold flue gas the temperature of the filter aid material is reduced to around 40° F. or lower, if desired, and at which temperature it is discharged into the receiver 12 for return to the mixing tank 10.

The mixing tank 10 and the filter 20 are maintained within an insulated inclosure 80 provided with cooling coils adapted to maintain the interior of the inclosure at approximately the temperature of the chilled oil in the mixer 10 so that the filter 20 and its connections can be maintained at substantially the same temperature so as to facilitate complete removal of the waxy constituents of the oil undergoing treatment. While only one filter has been described, it is contemplated that a plurality of filters may be employed and which may be supplied from the same mixing tank, the cycle of operation of each filter being regulated so that there may be a continual flow or delivery of chilled wax-bearing oil and filter aid material from the mixer 10 and also a substantially continual and uniform flow of filter cake into the pulping tank 33 thereby permitting the maintaining of substantially uniform and constant operating conditions in that portion of the apparatus devoted to the treating and recovery of the filter aid material.

The filter-aid material referred to in the foregoing description of applicants' invention is a comminuted inert solid filter-aid material of the character of diatomaceous earth and fuller's earth such as is customarily employed in plant scale dewaxing of wax-bearing fractions of petroleum oil by the filter-aid dewaxing method. Accordingly, in the appended claims the term comminuted solid filter-aid material is intended to designate a filter-aid material of this character.

Obviously many modifications and variations of the invention, as hereinbefore set forth, may be made without departing from the spirit and scope thereof, and therefore, only such limitations should be imposed as are indicated in the appended claims.

We claim:

1. In the dewaxing of hydrocarbon oil by filtration in the presence of a comminuted solid filter-aid material, the method of recovering the filter-aid material from the resulting filter cake which comprises mixing the filter cake with a petroleum fraction less volatile than gasoline, introducing the mixture to the mid-portion of a separating vessel wherein an intermediate layer of such mixture is maintained between a bottom layer of water and an upper layer of displaced hydrocarbon material, introducing steam to said intermediate layer to effect intimate and direct contact therewith to displace the hydrocarbon material which rises to the surface while the separated filter-aid settles down through the body of water, removing the displaced hydrocarbon material, filtering the settled filter-aid material to remove the bulk of water associated therewith, and exposing the filtered material to high temperatures to remove absorbed water and restore its filter-aid qualities.

2. In the dewaxing of hydrocarbon oil by filtration in the presence of a comminuted solid filter-aid material, the method of recovering the filter-aid material from the resultant filter cake and reconditioning it for mixing with chilled wax-bearing oil which comprises mixing the filter cake with a petroleum fraction less volatile than gasoline, introducing this mixture to a relatively large body of water, heating the mixture by introduction of steam thereto, subjecting the hot mixture to settling to effect separation of the adhering oil and waxy material from the filter-aid, removing the separated oil and waxy material, subjecting the remaining filter-aid to heating at elevated temperature to effect dehydration and restore its filter-aid qualities, and subjecting the resulting dried material to intimate contact with cold gas to thereby provide a precooled dehydrated filter-aid material adapted for mixing with chilled wax-bearing oil.

3. In the dewaxing of hydrocarbon oil by filtration in the presence of a comminuted solid filter-aid material, the method of recovering the filter-aid material from the resultant filter cake and reconditioning it for mixing with fresh wax-bearing oil which comprises mixing the filter cake with a petroleum fraction less volatile than gasoline, forming a suspension of the resulting mixture in water, subjecting the resulting suspension to heating and settling to effect separation of the oil and waxy material from the filter-aid, and subjecting the remaining wet filter-aid material to heating at elevated temperature to effect dehydration and to restore its filter-aid qualities.

4. The method of recovering and reconditioning comminuted solid absorbent material used in the separation of undesired constituents from mineral oil which comprises reducing the solid adsorbent material containing adhering hydrocarbon bodies removed from the oil to a substantially fluid mass by addition of a suitable proportion of water to form therewith a relatively fluid mixture, introducing the resulting mixture to the mid-portion of a separating zone wherein an intermediate layer of such mixture is maintained between a lower layer of water and an upper layer of displaced hydrocarbon bodies, heating said intermediate layer to about the temperature of boiling water whereby the adhering hydrocarbon bodies are displaced from the absorbent material and rise upwardly through said separating zone while the separated adsorbent material settles downwardly through said zone, removing the settled adsorbent material, and separating water associated therewith to thereby restore its adsorbent qualities.

5. In the dewaxing of hydrocarbon oil by filtration in the presence of a comminuted solid filter-aid material and as a result of which a filter cake containing wax hydrocarbons and the filter-aid is produced, the method of recovering the filter-aid material from the filter cake and reconditioning it for use in treating fresh wax-bearing oil, which comprises reducing the filter cake to a substantially fluid mass by admixture with a liquid adapted to form a slurry therewith, introducing the substantially fluid mass to a vessel containing a body of water at a temperature such that the waxy hydrocarbons are reduced to a substantially liquid condition and are disposed in a layer over the surface of the water, injecting steam to the mass at substantially the surface of the body of water whereby the filter-aid material is displaced from the hydrocarbons into the body of water, removing the filter-aid material containing water, and drying the same to restore its filter-aid qualities.

6. In the method of recovering solid filter-aid material from a wax filter cake obtained in dewaxing hydrocarbon oil by filtration in the presence of a comminuted solid filter-aid material wherein a mass of waxy hydrocarbons and solid filter-aid is introduced to a vessel containing a body of water at a temperature such that the waxy hydrocarbons are reduced to a substantially liquid condition and are disposed in a layer over the surface of the water, the step comprising injecting steam to the mass at substantially the surface of the body of water whereby the filter-aid material is displaced from the hydrocarbons into the body of water.

7. In the dewaxing of hydrocarbon oil by filtration in the presence of a comminuted solid filter-air material and as a result of which a filter cake containing wax hydrocarbons and the filter-aid is produced, the method of recovering the filter-aid material from the filter cake and reconditioning it for use in treating fresh wax-bearing oil which comprises mixing the filter cake with a petroleum fraction less volatile than gasoline, floating the mixture of wax, filter-aid and petroleum fraction on a body of water, heating and agitating the mixture whereby the filter-aid is displaced from the hydrocarbons into the body of water, removing the filter-aid material containing water, and drying the same to restore its filter-aid qualities.

8. In the dewaxing of hydrocarbon oil by filtration in the presence of a comminuted solid filter-aid material and as a result of which a filter cake containing wax hydrocarbons and the filter-aid is produced, the method of recovering the filter-aid material from the filter cake and reconditioning it for use in treating fresh wax-bearing oil which comprises agitating the filter cake with water to produce a slurry, floating the mixture of wax, filter-aid and water on a body of water, heating and agitating the mixture whereby the filter-aid is displaced from the hydrocarbons into the body of water, removing the filter-aid material containing water, and drying the same to restore its filter-aid qualities.

ROBERT E. MANLEY.
WILLIAM P. GEE.

CERTIFICATE OF CORRECTION.

Patent No. 2,020,693.                                November 12, 1935.

ROBERT E. MANLEY, ET AL.

It is hereby certified that error appears in the printed specification of th above numbered patent requiring correction as follows: Page 4, second column, line 3, for "-150°F." read -15°F.; page 5, first column, lines 32 and 46, respectively, claim 4, for "absorbent" read adsorbent; and second column, line 29-30, claim 7, for "filter-air" read filter-aid; and that the said Letters Patent should be read with these corrections therein that the same may conform to the record of the case in the Patent Office.

Signed and sealed this 21st day of January, A. D. 1936.

Leslie Frazer (Seal)                                   Acting Commissioner of Patents.